(12) United States Patent  
Zimmermann

(10) Patent No.: US 9,250,624 B2  
(45) Date of Patent: Feb. 2, 2016

(54) INDUSTRIAL ROBOT AND METHOD FOR PROGRAMMING AN INDUSTRIAL ROBOT

(75) Inventor: Uwe Zimmermann, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 1266 days.

(21) Appl. No.: 12/745,107

(22) PCT Filed: Dec. 10, 2008

(86) PCT No.: PCT/EP2008/067238  
§ 371 (c)(1),  
(2), (4) Date: May 27, 2010

(87) PCT Pub. No.: WO2009/080526  
PCT Pub. Date: Jul. 2, 2009

(65) Prior Publication Data  
US 2010/0312392 A1    Dec. 9, 2010

(30) Foreign Application Priority Data

Dec. 21, 2007  (DE) .......................... 10 2007 062 108

(51) Int. Cl.  
*G05B 19/423* (2006.01)

(52) U.S. Cl.  
CPC .... *G05B 19/423* (2013.01); *G05B 2219/36425* (2013.01); *G05B 2219/36455* (2013.01); *G05B 2219/36489* (2013.01); *G05B 2219/40119* (2013.01); *G05B 2219/40121* (2013.01); *G05B 2219/40122* (2013.01)

(58) Field of Classification Search  
USPC ............ 701/1, 2, 23; 700/253, 254, 245, 264, 700/258, 251, 252, 186, 247, 248, 259, 700/260; 318/567, 568.11, 568.12, 568.13, 318/568.14, 561; 901/2, 5, 7; 345/633  
See application file for complete search history.

(56) References Cited

U.S. PATENT DOCUMENTS

| | | | | |
|---|---|---|---|---|
| 5,488,689 A | * | 1/1996 | Yamato et al. | ................. 700/264 |
| 5,694,013 A | * | 12/1997 | Stewart et al. | ................. 318/561 |
| 5,880,956 A | | 3/1999 | Graf | |

(Continued)

FOREIGN PATENT DOCUMENTS

| | | |
|---|---|---|
| DE | 198 10 341 C2 | 9/1999 |
| DE | 696 22 572 T2 | 4/2003 |

(Continued)

OTHER PUBLICATIONS

European Patent Office; Search Report and Written Opinion in International Patent Application No. PCT/EP2008/067238 dated Mar. 4, 2009, 16 pages.

(Continued)

*Primary Examiner* — Tuan C. To  
*Assistant Examiner* — Dale Hilgendorf  
(74) *Attorney, Agent, or Firm* — Wood, Herron & Evans, LLP

(57) ABSTRACT

The invention relates to an industrial robot and a method for programming an industrial robot, for which the industrial robot is guided manually to a virtual surface (25) in the room, at which point the industrial robot is selected such that it cannot be guided any further manually. Next, that force (F) and/or torque acting on the industrial robot when an attempt is made to guide the industrial robot further manually is ascertained and stored, despite reaching the virtual surface (25).

11 Claims, 4 Drawing Sheets

(56) References Cited

U.S. PATENT DOCUMENTS

| | | | |
|---|---|---|---|
| 6,157,873 A * | 12/2000 | DeCamp et al. | 700/253 |
| 6,212,443 B1 * | 4/2001 | Nagata et al. | 700/245 |
| 6,285,920 B1 * | 9/2001 | McGee et al. | 700/254 |
| 6,385,508 B1 * | 5/2002 | McGee et al. | 700/254 |
| 6,430,474 B1 * | 8/2002 | DiStasio et al. | 700/245 |
| 6,812,665 B2 * | 11/2004 | Gan et al. | 700/245 |
| 7,099,745 B2 * | 8/2006 | Ebert | 700/245 |
| 7,298,385 B2 * | 11/2007 | Kazi et al. | 345/633 |
| 2002/0062177 A1 * | 5/2002 | Hannaford et al. | 700/245 |

FOREIGN PATENT DOCUMENTS

| | | |
|---|---|---|
| DE | 103 24 517 A1 | 12/2004 |
| EP | 0 439 655 A1 | 8/1991 |
| EP | 0 573 657 A1 | 12/1993 |
| EP | 1 508 396 A1 | 2/2005 |
| JP | 5-303422 | 11/1993 |
| JP | 7-132435 A | 5/1995 |

OTHER PUBLICATIONS

Arvind Balijepalli et al.; "An Exploratory Haptic Based Robotic Path Planning and Training Tool", Proceedings of the 2002 IEEE, May 2002, pp. 438-443.

Xuejian He et al.; "A Haptic Virtual Turning Operation System"; Mechatronics and Automation, Proceedings of the 2006 IEEE; Jun. 2006; pp. 435-440.

European Patent Office; Search Report in International Patent Application No. PCT/EP2008/067238 dated Mar. 4, 2009, 6 pages.

* cited by examiner

INDUSTRIAL ROBOT AND METHOD FOR PROGRAMMING AN INDUSTRIAL ROBOT

TECHNICAL FIELD

The invention relates to a method for programming an industrial robot, and to an industrial robot.

BACKGROUND

Industrial robots are manipulating machines, which are equipped with useful tools for automatic handling of objects and are programmable in a plurality of motion axes, in particular with regard to orientation, position and process sequence. A method for programming the industrial robot (programming method) is understood as the systematic procedure for creating user programs.

One generally known programming method is the so-called playback method, in which the programming of an operation is accomplished by manually guiding the industrial robot along a desired curve in space. As this is done, the actual current position values, i.e., the axis position or the TCP position (tool center point position) of the industrial robot, is captured into the user program in a defined time or distance raster.

EP 1 508 396 A1 discloses a method for controlling the pressing force of a welding tongs guided by means of an industrial robot. The force acting on the welding tongs is measured during the welding, and the robot is adjusted so that the force acting on the welding tongs is equal to a predefined target force.

SUMMARY

The object of the invention is to specify a method for programming an industrial robot which allows an operator of the industrial robot to program the industrial robot in a relatively simple way so that the latter exhibits a predetermined force and/or moment behavior when executing the corresponding user program.

Another object of the invention is to specify a corresponding industrial robot.

The problem of the invention is solved by a method for programming an industrial robot, having the following procedural steps:
  manually guiding an industrial robot to a virtual surface in space, upon arrival at which the industrial robot is actuated so that it cannot be guided any further manually,
  determining the force and/or the torque that acts on the industrial robot when an attempt is made to guide the industrial robot further manually despite its having reached the virtual surface, and
  storing the force and/or torque.

The problem of the invention is also solved by an industrial robot that is set up to be guided manually, having
  a robot arm with a flange and a plurality of axes that are movable by drives,
  a control device that is set up to actuate the drives to move the axes, and when the industrial robot is guided manually, to actuate the drives when a virtual surface in space is reached, in such a way that the industrial robot cannot be guided further manually, and
  means for determining a force and/or torque, which are set up to determine the force and/or torque that acts on the industrial robot when an attempt is made to continue guiding the industrial robot manually despite its having reached the virtual surface, the control device being set up to store the force and/or torque.

The industrial robot according to the invention is set up so that it can execute the method according to the invention.

The industrial robot is set up to be guided manually. Manual guidance makes it possible, among other things, to program the motion of the industrial robot, for example the path of the flange of the industrial robot, by guiding the flange along the path and storing at least some of the points of that path.

The manual guidance can be realized for example by pulling at least indirectly on the flange. When the industrial robot is in operation, for example, a tool can be attached to the flange. If the industrial robot is in a mode in which it is being guided manually, then the flange can be set up so that instead of the tool a grip is attached to the flange, with which the industrial robot can be guided manually. Pulling on the grip pulls indirectly on the flange. The grip may also have input means, for example buttons, which when operated cause the current position and/or orientation of the flange or the positions of the axes to be stored in the control device.

However, the industrial robot according to the invention is also set up so that alternatively or in addition a force and/or a torque to be applied by the industrial robot can be programmed by means of the manual guidance. To that end the virtual surface is provided, upon reaching which the control device of the industrial robot actuates the drives in such a way that the industrial robot cannot be moved further by the manual guidance. If an attempt is nevertheless made to guide the industrial robot further manually, for example if an attempt is made to continue pulling in the direction of the virtual surface, then the further pulling on the flange or grip (manual guidance in general) exerts a force and/or torque acting on the industrial robot that can be ascertained using the means for determining a force and/or torque. The force or torque exerted on the industrial robot may then be stored with the current position and/or orientation of the industrial robot, so that when the industrial robot is in operation, in which the control device actuates the drives of the industrial robot for an automatic motion, the latter exerts the stored force or stored torque for example on a workpiece.

The means for determining a force and/or torque may be for example an internal force and/or torque sensor of the industrial robot, which is positioned for example on the flange, between the grip or tool and the flange or between the flange and the rest of the robot arm, and measures directly the force and/or torque acting on the flange. However, the means for determining a force and/or torque may also be realized by having them ascertain the torques applied by the drives of the industrial robot. If the drives are electric drives, then the torques of the drives can be ascertained for example by analyzing the electric currents of the electric motors of the electric drives.

According to one embodiment of the method according to the invention, the virtual surface is part of a virtual environmental model, which is based on a computer model of a workpiece to be processed with the industrial robot. The industrial robot according to the invention may be used for example to process a workpiece automatically. For the automatic processing, it may be necessary to program a specified force profile and/or a specified torque profile. According to this variant, it is possible for example to guide the industrial robot manually along the virtual environmental model, in order for example to program the position and/or orientation of the industrial robot, but also forces and/or torques to be applied. The virtual environmental model includes in particular information about the position and/or orientation occupied by the workpiece during the automatic processing by the industrial robot. Since the virtual environmental model is used for the programming, and not the actual workpiece, by pulling on the flange (or grip, etc.) it is possible to program a force and/or torque to be applied. The force or torque to be applied during the automatic processing of the workpiece by the industrial robot according to the invention corresponds to the force (torque) that acts on the industrial robot by the pulling (manual guidance) during the programming.

But if the actual workpiece (or an actual dummy workpiece) were to be used for programming the industrial robot, then it would not be possible to measure any force when touching the workpiece and simultaneously continuing to pull on the industrial robot, since the force is of course absorbed by the actual workpiece.

According to another embodiment of the method and industrial robot according to the invention, the virtual surface is oriented in space in such a way that it envelops at least partially a workpiece that is to be processed with the industrial robot, so that the industrial robot stops a motion carried out on the basis of the manual guidance before the industrial robot touches the workpiece. This variant enables an operator to see the position and/or orientation occupied by the workpiece during the automatic processing by the industrial robot. Because the virtual surface at least partially envelops the workpiece, the industrial robot according to the invention stops during the manual guidance shortly before the workpiece, without touching it. It is then still possible to ascertain the force or torque that acts on the industrial robot during additional manual pulling on the flange.

The industrial robot according to the invention can be guided manually. In order to make the manual guidance easier for an operator, the industrial robot according to the invention can be gravity-compensated. This can be achieved by equipping each of the joints of the industrial robot with torque sensors, and by the industrial robot according to the invention having an appropriate control system and an appropriate model for compensating for dynamic and static forces, in particular gravitation.

Because of the use of the virtual surface, the industrial robot according to the invention is not in contact with any real component during the programming. As a result, the open kinematics of the industrial robot according to the invention can be used to record the "virtual" environmental force which is assigned to the force resulting from the pulling on the industrial robot.

In order to be able to do this, the force that occurs on the actual component while it is being processed automatically by the industrial robot according to the invention can be calculated, and according to one embodiment can be displayed to the operator. This sub-problem can be solved using known methods from haptics. One option for this is to use an algorithm that calculates the correspondingly operative force from the computer model, for example in the form of CAD data, and the current position of the robot. This can then be used to regulate the torques of the industrial robot so that the operator feels a corresponding resistance. While in this case a corresponding force is calculated from a position, known methods also exist which calculate a corresponding position from the user force. Here too, the operator senses a corresponding contact force.

The obtained forces and/or torques can be saved, in particular in reference to time or to position. Before being played back (creation of the user program), the recorded data assigned to the forces or torques can be changed by means of data processing (data reduction, splining, optimization). When the user program is played back, the saved data may influence the robot motion in any way. This means that both force (torque) and position were recorded. As a rule, both conditions cannot be regulated simultaneously. Thus any desired regulating concepts can be carried out on the data obtained (e.g., hybrid regulation, impedance regulation).

BRIEF DESCRIPTION OF THE DRAWINGS

Examples of exemplary embodiments of the invention are depicted in the attached schematic drawings. The figures show the following.

DETAILED DESCRIPTION

Figure 1:
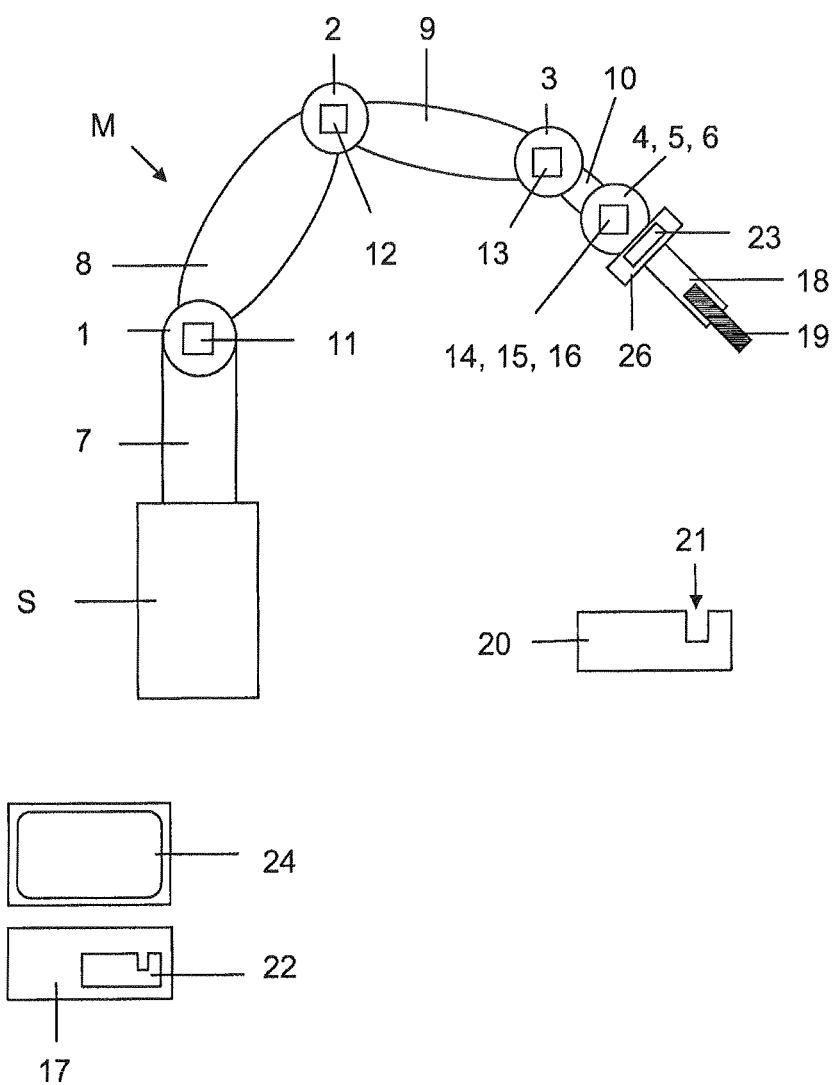
FIG. 1 an industrial robot.

FIG. 1 shows an industrial robot having a robot arm M, which in the case of the present exemplary embodiment is attached to a base S.

Robot arm M of the industrial robot has a plurality of axes 1-6, a plurality of levers 7-10 and a flange 26, to which a tool, for example a gripper 18, may be attached. In the case of the present exemplary embodiment, each of the axes 1-6 is moved with an electric drive, each of which has an electric motor 11-16. The electric drives are electrically connected to a control computer 17 in a manner not shown, so that control computer 17 or a computer program running on control computer 17 is able to actuate the electric drives in such a way that the position and orientation of flange 26, and thus of the tool attached to the industrial robot, can be oriented essentially freely in space.

In the case of the present exemplary embodiment, the industrial robot is not only intended to move flange 26 or the gripper 18 attached to flange 26 on a predetermined path, but also to exert a predetermined force and/or a predetermined torque on flange 26 or on gripper 18, so that this force (torque) acts on a workpiece that is to be processed with the tool. This is necessary for example if the industrial robot is intended to fit a plunger 19 gripped with gripper 18 into a gap 21 in a metal block 20 with a certain force and/or a certain torque.

So that the industrial robot being used can move the flange 26 as desired, and in particular can exert the desired force and/or the desired torque on flange 26, for example in reference to position or time, a computer program that appropriately controls the industrial robot runs on control computer 17.

Figure 4:
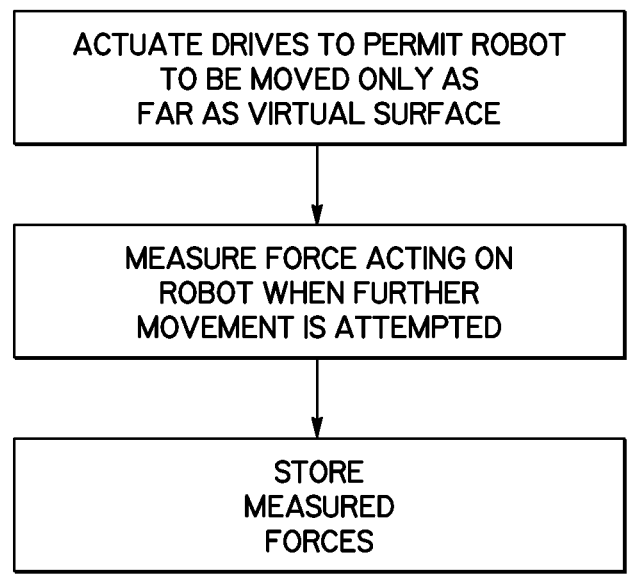
FIG. 4 a flow chart that illustrates the programming of the industrial robot.

In the case of the present exemplary embodiment, this computer program is created by guiding the industrial robot manually. During the manual guidance the industrial robot or its flange 26 is brought to the desired position, for example by a person not shown in FIG. 1 pulling flange 26 to the desired position and aligning it there as desired. For the programming, instead of the gripper 18 a grip G depicted in FIG. 2 may be attached to flange 26, which grip G has input means which are not shown for the sake of clarity, such as buttons, upon actuation of which the current position of the industrial robot is saved for the aforementioned computer program. FIG. 4 summarizes steps in creating the computer program by means of a flow chart.

The forces and/or torques intended to be exerted by the industrial robot in reference to position or time are programmed in the case of the present exemplary embodiment by means of a computer model 22 of block 20 stored in control computer 17. Computer model 22 is for example a CAD model of block 20, which models the latter at a scale of 1:1. In addition, computer model 22 includes a specification of the situation in space, i.e., it models both the position and the orientation of block 20.

Figure 2:
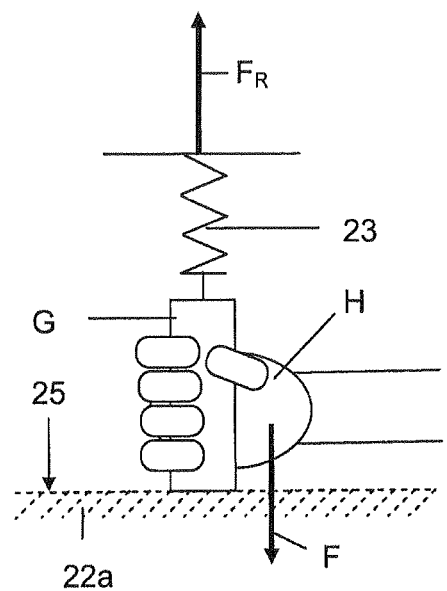
FIGS. 2 and 3 a gripper for guiding the industrial robot manually.

In order to now program the desired forces or torques to be exerted, control computer 17 actuates the electric drives of the industrial robot in such a way that the person who is guiding the industrial robot by means of the grip G is able to move the grip G only as far as a virtual surface 25, which is determined by computer model 22 of block 20. In other words, the industrial robot can be guided as if block 20 were actually present, so that the person whose hand H is shown in FIG. 2 cannot move the industrial robot any further when it reaches the virtual surface (step A of the flow chart).

In the case of the present exemplary embodiment, virtual surface 25 is part of a virtual environmental model 22a assigned to computer model 22 or to block 20, which simulates block 20. If grip G reaches virtual environmental model 22a or virtual surface 25, then the person is unable to move the industrial robot any further in the direction of virtual environmental model 22a. If the person nevertheless wishes to move the industrial robot further, then a force F acts on the industrial robot in the direction of virtual environmental model 22a. The force F can be measured for example with a force sensor 23, which is attached for example to flange 26 and measures the forces acting on flange 26 or on grip G (step B of the flow chart).

Force sensor 23 is connected to control computer 17 in a manner not shown, and transmits signals assigned to the measured forces to control computer 17. In the case of the present exemplary embodiment, force sensor 23 measures forces in and transverse to the longitudinal axis of grip G.

In the case of the present exemplary embodiment, control computer 17 is connected to a monitor 24, so that the forces measured with force sensor 23, and thus the currently exerted force F, can be displayed to the person. That makes it possible for the person, on the basis of the manual guidance of the industrial robot, to save the forces to be exerted on block 20 during operation of the industrial robot while the programming is taking place, for example by activating the input means of grip G (not shown in further detail) in relation to position and/or time in control computer 17 (step C of the flow chart).

The data recorded while the industrial robot is being programmed can then be changed by means of data processing (e.g., data reduction, splining, optimization) before the operation of the industrial robot, in the course of which the industrial robot moves gripper 18. During operation of the industrial robot, the saved data may influence the robot motion in any way. That means that in the case of the present exemplary embodiment both the force F and the position were recorded during the programming.

In order to make it easier to guide the industrial robot manually, the industrial robot may have torque sensors assigned to the joints of the industrial robot, which are not shown in greater detail in the figures but are generally known to the person skilled in the art. Dynamic and static forces, in particular gravitational forces of the industrial robot, can be compensated for during the manual guidance by means of appropriate regulation and an appropriate model of the industrial robot.

It is also possible to ascertain the force F acting during the programming of the industrial robot on the industrial robot, by means of a counterforce $F_R$ to be produced by the industrial robot and directed counter to the force F, for example by analyzing the torques produced by the industrial robot or its electric motors 11-16. The torques produced by the industrial robot can be ascertained for example by analyzing the electric currents of electric motors 11-16.

Figure 3:
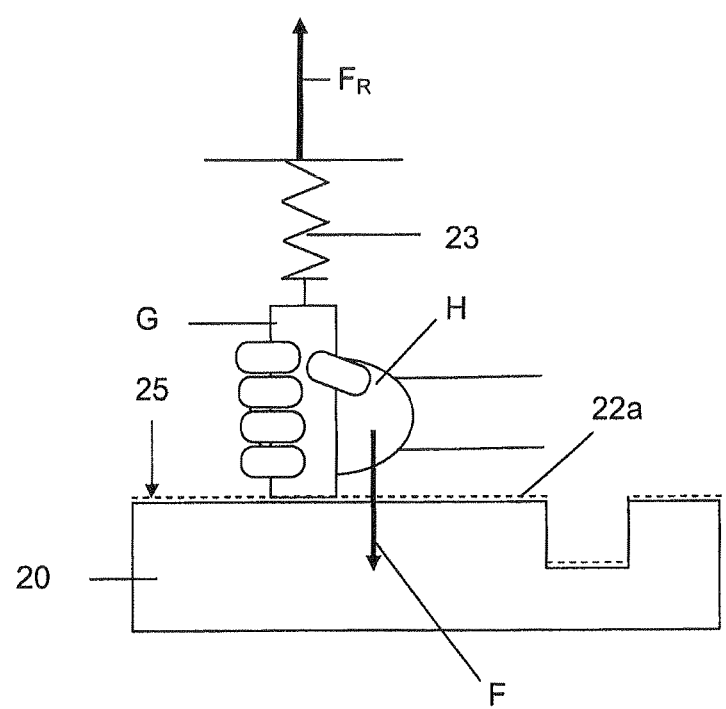

In the case of the exemplary embodiment shown in FIG. 2 and described above, the person can program the forces F to be applied by the industrial robot on the basis of the computer model 22 of the block and the virtual environmental model 22a. FIG. 3 shows another exemplary embodiment, in which the virtual model of the environment 22a based on computer model 22 virtually envelops block 20, so that when the industrial robot is guided manually in the direction of block 20 the industrial robot is stopped shortly before touching block 20 because of the virtual environmental model 22a. As a result, it is also possible to exert the force F on flange 26 by continuing to pull grip G in the direction of block 20.

What is claimed is:

1. A method of programming an industrial robot having a flange for receiving a tool or object, the method comprising:
    placing the robot in a state wherein the robot flange can be manually guided;
    manually guiding the robot flange to a virtual surface defined in space;
    actuating the robot to resist further manual movement of the flange past the virtual surface once the robot flange has arrived at the virtual surface;
    sensing, with a sensor or a drive mechanism, at least one of a force or a torque acting on the robot when further movement of the flange is attempted after having arrived at the virtual surface; and
    storing the sensed force or torque for subsequent recall during operation of the robot.

2. The method of claim 1, wherein the virtual surface is part of a virtual environmental model based on a computer model of a workpiece to be processed using the industrial robot.

3. The method of claim 1, further comprising:
    orienting the virtual surface in space such that the virtual surface envelops at least part of a workpiece that is to be processed using the industrial robot such that actuating the robot to resist further manual movement of the flange past the virtual surface stops manual movement of the robot before the flange touches the workpiece.

4. The method of claim 1, wherein manually guiding the robot flange comprises applying force directly to the robot flange.

5. The method of claim 1, wherein determining at least one of a force or a torque comprises sensing the force or torque using at least one of:
    1) an internal force sensor or torque sensor of the industrial robot; or
    2) drive mechanisms used for articulating the industrial robot.

6. An industrial robot, comprising:
    a robot arm configured for manual and driven movement;
    a plurality of drives associated with respective axes of said robot arm and operable to actuate said robot arm for movement about said respective axes;
    a flange on said robot arm and adapted to receive a tool or object;
    a control operative to actuate said drives for movement of said robot arm about said respective axes and, when the robot is being manually moved, to actuate said drives to resist further manual movement of the robot when a virtual surface defined in space is reached by said flange; and
    at least one device operative to sense at least one of a force or torque acting on the industrial robot when further manual movement of said flange is attempted after having reached the virtual surface.

7. The industrial robot of claim 6, wherein said control stores the determined force or torque.

8. The industrial robot of claim 6, wherein the virtual surface is part of a virtual environmental model based on a computer model of a workpiece to be processed using the industrial robot.

9. The industrial robot of claim 6, wherein said at least one device for sensing the at least one force or torque comprises an internal force sensor or torque sensor associated with the industrial robot.

10. The industrial robot of claim 6, wherein said at least one device for sensing the at least one force or torque comprises said drives used for actuating said robot arm.

11. The industrial robot of claim 6, wherein said control is operative to save information associated with at least one of a position or orientation of the industrial robot when a force or torque is exerted to further manually move said robot arm after having reached the virtual surface.

* * * * *